United States Patent
Roos

[11] 3,744,824
[45] July 10, 1973

[54] PIPE COUPLINGS
[75] Inventor: Erling Roos, Skien, Norway
[73] Assignee: Granges Essem AB, Vasteras, Sweden
[22] Filed: June 26, 1972
[21] Appl. No.: 266,466

Related U.S. Application Data
[63] Continuation of Ser. No. 50,037, June 26, 1970.

[52] U.S. Cl. ................................. 285/317, 285/320
[51] Int. Cl. ............................................ F16l 37/12
[58] Field of Search .................... 285/317, 319, 320, 285/321, 423, 335

[56] References Cited
UNITED STATES PATENTS
| | | | |
|---|---|---|---|
| 3,510,153 | 5/1970 | Newton | 285/320 X |
| 3,134,613 | 5/1964 | Regan | 285/317 X |
| 310,672 | 1/1885 | Hackley | 285/317 X |
| 3,271,053 | 9/1966 | Kurachi | 285/317 X |
| 1,056,197 | 3/1913 | McKee | 285/320 X |
| 3,199,553 | 8/1965 | Garrett et al. | 285/320 X |
| 3,456,963 | 7/1969 | Dillon | 285/321 X |
| 3,272,538 | 9/1966 | Bergstrom | 285/317 X |

Primary Examiner—Thomas F. Callaghan
Attorney—Waters, Roditi, Schwartz & Nissen

[57] ABSTRACT

A pipe coupling arrangement in which one end of two pipes being connected together is adapted to be passed over the opposing end of the other pipe, and in which at least one circumferential, radially open groove is arranged in opposing sides of the pipes in coupled position, in which are provided pivotable locking means mounted on a spring ring and adapted to engage the opposing grooves in said pipe ends to prevent the pipes from being separated in a direction opposite to that in which they are coupled.

7 Claims, 2 Drawing Figures

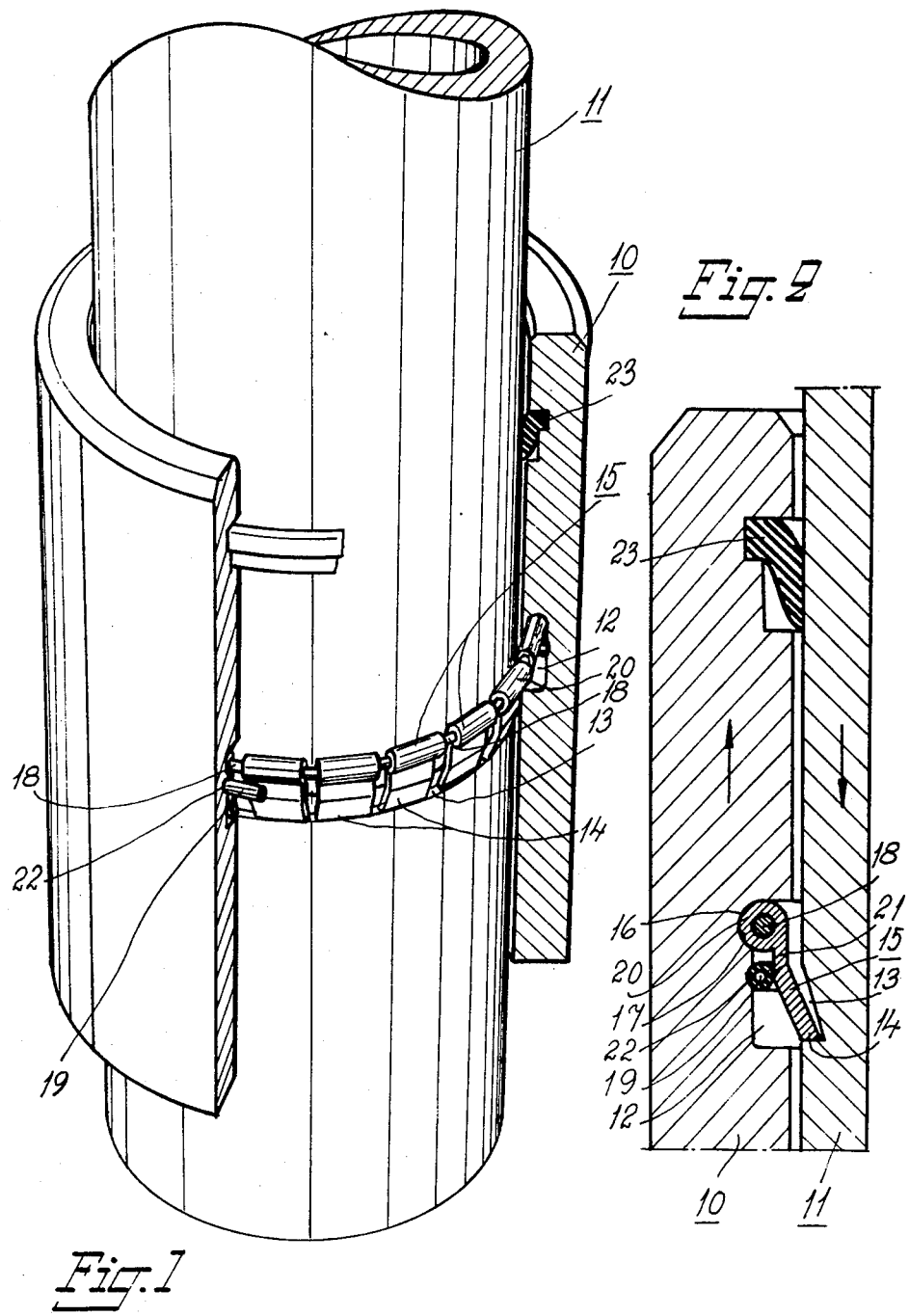

PIPE COUPLINGS

This application is a continuation of Ser. No. 50,037, filed June 26, 1970, and now abandoned.

The present invention relates to an apparatus for connecting together two pipes having portions one of which, when the pipes are coupled, extends over the other, each of said pipes having in opposing sides at least one circumferential, radially open groove, a coupling element being retained in the groove of one pipe against axial displacement and including a plurality of locking means disposed around the retaining groove, and having parts which, under the action of a spring means, project resiliently out of the retaining groove and which are adapted to snap into the groove of the other pipe, and wherein the outwardly projecting parts of the locking means and the groove of said other pipe present substantially radial surfaces adapted to co-act to prevent the two pipes from being separated in a direction opposite to that in which they were coupled.

An object of the present invention is to provide a novel and reliable simple construction of a pipe coupling of the type referred to which enables two pipes to be joined together rapidly by simple hand movements.

The pipe coupling of the present invention is mainly characterized in that the locking means and the retaining groove present complementary bearing surfaces, by means of which the locking means are journalled for pivoting movements about an axis extending peripherally of said one pipe, and in that the locking means are arranged in pre-determined spaced relationship on a ring which urges the bearing surfaces of said locking means against associated bearing surfaces in the retaining groove.

By means of such an arrangement, it is also possible to couple together in a reliable manner pipes of large dimensions and pipes which are intended to conduct therethrough a medium under high pressure. The locking means can be made extremely strong and robust, since the effect produced thereby does not rely to any great extent on the inherent spring characteristics thereof. No great degree of accuracy is required with respect to the pipes and the grooves disposed therein, and pipes having a high coefficient of expansion, such as plastic pipes, can be joined together in a simple and reliable manner by means of the coupling of the present invention. The novel coupling is thus primarily intended for joining together plastic pipes of relatively large dimensions, although the invention is by no means restricted to the material from which the pipes are made or the dimensions of said pipes.

The invention will now be described in detail with reference to an embodiment thereof illustrated in the accompanying drawings, additional characteristic features of the invention being disclosed in conjunction therewith.

In the drawing:

FIG. 1 is a perspective view of an apparatus for coupling together two pipes in accordance with the invention, portions of the pipes having been cut away to illustrate the construction of the arrangement more clearly; and FIG. 2 is an axial sectional view on enlarged scale of a portion of the apparatus illustrated in FIG. 1.

In FIGS. 1 and 2 are shown portions of two pipes 10 and 11 respectively which are coupled together by means of a coupling arrangement according to the invention. With respect to the pipe 10, the drawings only illustrate a widened or flared portion thereof, which projects over the pipe 11 and which has a wall thickness greater than its remaining portion and that of the pipe 11. In the opposing surfaces of the pipes 10 and 11 are disposed open circumferential grooves 12 and 13 respectively. A coupling element, which can be fully accommodated and retained in the groove 12 includes a plurality of parts 14 which project resiliently from the retaining groove 12 and which are snapped into the groove 13. As will best be seen from FIG. 2, the parts 14 and the groove 13 present substantially radial surfaces adapted to co-act to prevent the two pieps 10, 11 from being separated in a direction opposite to that in which they are coupled. The direction in which the pipes are brought together is indicated by the arrows in FIG. 2.

In accordance with the invention, the coupling element includes an annulus of locking means 15 arranged in spaced relationship with respect to each other and journalled for pivoting movement about an axis extending peripherally around the pipe 10. Each locking means 15 presents at its end remote from the part 14 a bearing surface 16 which is held in contact with a corresponding bearing surface 17 in the retaining groove 12 by means of a ring 18 connecting the locking means 15 together. Between the locking means and the bottom of the groove 12, spaced from the bearing surfaces 16, 17 is arranged a spring means 19 which tends to swing the parts 14 of the locking means 15 out of the groove 12.

As illustrated in the drawing, each locking means 15 suitably includes a substantially cylindrical portion 20 surrounding the ring 18 and the cylindrical surface of which forms the aforementioned bearing surface 16, and a portion 21 projecting outwardly from the portion 20 and having a free end part 14 which engages in the groove 13. Te bearing surface 17 is formed by a circumferential recess arranged in the bottom of the groove 12, the cylindrical portions 20 being held extended into the recess by the action of the ring 18 to such an extent that no other means are required for retaining the coupling element axially in the groove 12. The locking means 15 may be journalled on the ring 18 so as to pivot thereon. If the locking means, furthermore, are arranged so as to be movable along the ring 18, spacers (not shown) are arranged between the locking means, thereby maintaining the locking means in such spaced relationship that the parts 14 are unable to contact each other in a manner which prevents them from reaching the bottom of the groove 13. Such spacers may be loosely fitted on the ring 18 between each locking means, or may form a portion of the cylindrical portions 20 thereof. The locking means may also be securely attached to the ring, in which case said ring must be of such construction that it does not prevent the parts 14 from pivoting out of the groove 12. Irrespective of whether the locking means are rigidly affixed to the ring 18 or journalled for movement thereon, it is to advantage to construct the ring in the form of a circlip, wherewith the two ends of the ring can be inserted freely into a sleeve-like portion, for example the cylindrical portion 20 of one of the lokcing means. THe circlip or split spring ring can be made of elastically bending a suitable length of straight resilient wire-like material into a ring, on which the locking means are mounted and optionally secured and snapped into the recess forming the bearing surface 16 in the groove 12.

The portion 21 of each locking means 15 extends substantially tangentially from the area of the cylindrical portion 20 remote from the bottom of the groove 12. In order to minimize the depth of the groove 12 but still insure that the part 14 of each locking means 15 snaps into the grooves 13 in the pipe 11, each part 14 may be slightly angled in a direction outwardly of the groove 12, in the manner illustrated.

In the illustrated embodiment, the spring means 19 consists of an annular body of elastic material, for example rubber, the external diameter of the annular body exceeding the diameter of the groove 12 at the bottom of said groove and being axially localized by positioning a portion thereof in a circumferential recess 22 in the bottom of the groove 12. It is, however, possible with certain embodiments of the locking means and the annular body to exclude the last mentioned groove. It is also possible to replace the ring 19 with cushions of elastic material, for example pieces of foam rubber attached to the portions 21, acting between the locking means and the bottom of the groove 12, at a distance from the bearing surface.

Since the coupling of the present invention, as described hitherto, is not leak-proof, a special seal must be arranged, when desiring to seal the joint between the two connected pipes. It will be understood that a seal between the pipes 10 and 11 in their coupled position can be provided in a large number of different ways by means of one or more sealing rings. FIGS. 1 and 2 illustrate a sealing arrangement which is to be preferred, particularly when pipes 10, 11 are used for conveying media under high pressure. The seal is provided by means of a circumferential sealing ring 23, a portion of which is accommodated in an open circumferential groove in the pipe 10 axially outside the retaining groove 12. This is expedient because the illustrated portion of the pipe 10 has a larger wall thickness than the pipe 11 and because the same pressure prevails both outside and inside the pipe 11 in the region where the pipe has been weakened by the groove 13.

Although the invention is not restricted thereto, the pipes 10, 11 may be of a polyolefin, for example polyethylene, and the locking means may be made of any suitable metal or plastic material, such as aluminum or copper or polyacetal, polyamide, reinforced melamines or carbamides.

The invention is not restricted to the described and illustrated embodiment, but may be modified within the scope of the concept of the invention with respect to the design of the grooves, the coupling element and the spring means and also the arrangement of the seal. In connection herewith it can be mentioned that more than one coupling element with associated grooves similar to the groove 12 and 13 can be arranged, and that the coupling element can be retained in a groove in the inner pipe.

What is claimed is:

1. A pipe coupling for joining together two plastic pipes having end portions, one of which, when the pipes are coupled, extends over the other, aligned circumferentially extending grooves being provided on opposed surfaces on the end portions, a recess being provided in one of said grooves, said grooves and said recess being radially open, the coupling comprising a plurality of latching means, each having at one end a curved bearing surface, latching arms extending from said bearing surfaces and having radial abutment surfaces, a resilient ring carrying said latching means in a circumferential array and urging said bearing surfaces into continuous engagement with said recesses, the latter conforming to said bearing surfaces and being disposed in the associated groove in one pipe, adjacent one radial end surface of said one groove, said radial end surface including a continuation of one wall of said recess so as to form a generally straight line therewith, and spring means acting between the bottom of said one groove and said latching arms to snap the latter into the other groove on the other pipe, said other groove having a radial end wall arranged to co-act with said radial abutment surface, wherein said spring means, operative between said bottom of the one groove and said latching arms, ensures that the latter always adopt a position wherein they engage said groove in the other pipe.

2. The pipe coupling according to claim 1, wherein said latching means include cylindrical latching members, said curved bearing surfaces being arranged on respective ones of said cylindrical members, said ring passing axially through said cylindrical members, said latching arms extending substantially tangentially from the region of the associated cylindrical members, remote from said botton of said one groove provided with said recess.

3. The pipe coupling according to claim 2, wherein said latching arms include portions remote from said cylindrical members and angled outwardly of said one groove provided with said recess.

4. The pipe coupling according to claim 3, wherein said latching members are fixed to said ring.

5. The pipe coupling according to claim 4, wherein said latching members are arranged to pivot on said ring.

6. The pipe coupling according to claim 5, wherein said spring means include an annular body of resilient material positioned in said one groove provided with said recess, said annular body being accommodated in a circumferential, radially open second recess disposed in said bottom of said one groove.

7. The pipe coupling according to claim 6, further comprising sealing means arranged between the pipes to be coupled, and located in a second circumferential groove provided in the end portion of the pipe which extends over the other pipe, and axially outwardly of said first-named groove.

* * * * *